Aug. 14, 1951  A. LANG  2,564,162
WIRELESS CHECK ROW ATTACHMENT FOR CORN PLANTERS
Filed Jan. 25, 1947
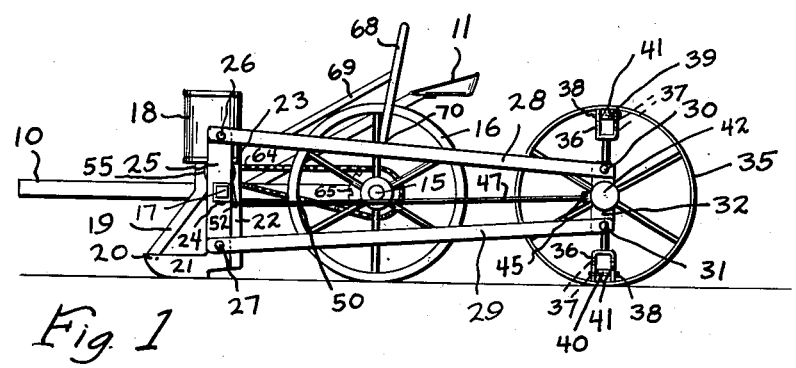
Fig. 1
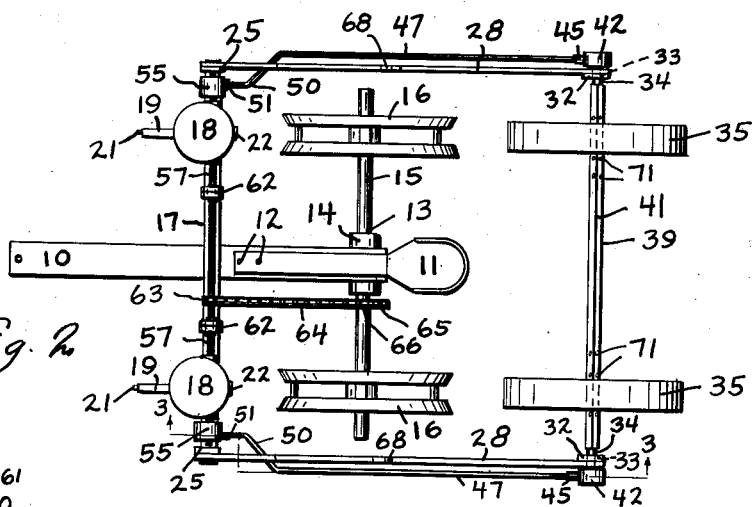
Fig. 2
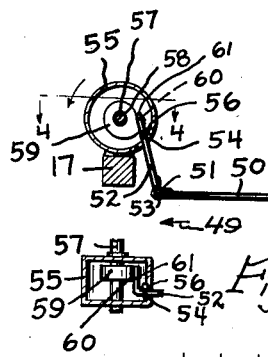
Fig. 3
Fig. 4
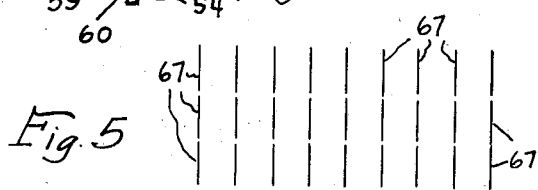
Fig. 5
INVENTOR.
Anthony Lang
BY
Sam J. Slotsky
ATTORNEY Patented Aug. 14, 1951

2,564,162

UNITED STATES PATENT OFFICE 2,564,162

WIRELESS CHECK ROW ATTACHMENT FOR CORN PLANTERS

Anthony Lang, Laurens, Iowa

Application January 25, 1947, Serial No. 724,409

2 Claims. (Cl. 111—23)

My invention pertains to an attachment for corn planters.

An object of my invention is to provide an attachment wherein the seed hoppers of a corn planter will be actuated at proper intervals to deposit seeds in the ground, without requiring the use of the lengthened tripping wire members.

A further object of my invention is to provide rotating members in association with the seed depositing means, which rotating members merely provide a trigger effect only, to allow the depositing mechanism to be released at the required interval, with the actual work of actuating the depositing mechanism being provided in the planter mechanism itself, this feature thereby providing a greater accuracy since a minimum amount of strain will be imparted against the rotating members, so that the planter can perform its functions more satisfactorily.

A further object of my invention is to provide the above described rotating members whereby the unevenness of the ground surface over which the arrangement travels, will not unduly hinder the operation thereof.

A further object of my invention is to provide a simplified structure which can be used principally as an attachment for various types of planters.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a side elevation of the attachment as attached to a corn planter,

Figure 2 is a plan view of Figure 1,

Figure 3 is an enlarged detail view of the cam control means taken generally along the line 3—3 of Figure 2.

Figure 4 is a plan section taken along the lines 4—4 of Figure 3, and

Figure 5 is a diagrammatic view showing how the transverse lining bars would appear in the soil when used with my arrangement.

My invention contemplates the provision of an apparatus which can be used in connection with corn planters wherein the check row wire can be eliminated, and also wherein the seed depositing actuating mechanism of the planter is not operated directly from the spacing arrangement, the spacing arrangement itself merely performing the functions of a trigger to release the power effect of the actuating mechanism which power effect is obtained from the planter wheels. My invention also contemplates the provision of certain members so arranged to insure accuracy of the apparatus, so that the rows are planted in straight alignment transversely as well as longitudinally.

I have used the character 10 to designate the forward hitching bar of a planter which is usually attached to a tractor for drawing the same, and the character 11 indicating the seat being attached at 12. Journaled at 13 within a suitable housing 14 is the axle shaft 15 upon which shaft are secured the planter wheels 16, these wheels being adjustably secured by slidable connections or any other type of connection, so that they can be positioned at desired spacings laterally.

Attached transversely across the member 10 is a bar 17 to which are attached the seed hoppers 18, these seed hoppers also being adjustably secured by suitable slidable connections to the bar 17 so that they also can be spaced as desired to correspond to the wheels 16. Secured to the members 18 are the braces 19 which are attached at 20 to the runners 21, with the seed depositing channels 22 communicating at 23 with the hoppers 18, the hoppers 18 including the usual mechanism therein for depositing the seed in the ground through the channels, such mechanism including the usual arrangements for allowing the seed to gravitate at the necessary intervals and such mechanism being well known in the art and not requiring description herein.

Attached at 24 at either extremity of the transverse bar 17 are the vertical supports 25 to which are pivotally attached at 26 and 27 the rearwardly extending bars 28 and 29 which are pivoted at 30 and 31 respectively to the further vertical members 32. Journaled within the members 32 at 33 is a further rear shaft 34 which is attached to the hub portions of a pair of further wheels 35. The wheels 35 include the elongated substantially U-shaped members 36, the members 36 including a series of openings 37 for the reception of the bolts 38. The bolts 38 pass through, and securely lock, the pair of triangular shaped transverse bars 39 and 40, such bars including the sharpened edges at 41, one of the bars, such as 40 being slightly heavier than the other bar for the purpose to be described later. In most cases, however, the bars 39 and 40 will be positioned practically at the outer limits of the wheels 35.

The ends of the shaft 34 pass through housings 42 at 43 and will rotate with respect to the housings, the housings 42 being circular as shown, and attached to the ends of the shaft 34 are pairs of slightly raised projections 44. The housings 42 include the projecting portions 45 having openings 46 for the reception of the lengthened rods 47 which terminate in rollers 48 for abutment against the shaft 34 and the portions 44. The projections 44 are positioned at right angles with respect to the transverse rods 39 and 40, or are a quarter turn around from the rods 39 and 40, so that when either of the rods 39 or 40 is being pressed into the ground, either one of the projections 44 will be striking against a roller 48 to actuate the rod 47 in the direction of the arrow 49 (see Figure 2). In other words, as shown in Figure 3, neither of the rods 39 or 40 is penetrating the soil, being directly at right angles to the positioning of the members 44, but one of the triangular rods will penetrate the soil as soon as one of the projections 44 actuates the rods 47. It will be understood, however, that if desired other projecting arrangements or cams such as 44 can be employed wherein they are in line with the triangular rods, in which case, however, the rod structure 47 will be modified slightly.

The rods 47 are bent inwardly at 50 and are pivotally secured at 51 to the levers 52, with a torsion spring 53 being attached to the rods 47 and the levers 52 to throw the rods 47 to engaging position at all times. The levers 52 pass through suitable openings 54 within the casings 55 which casings are attached to the transverse bar 17, the levers 52 being pivoted at 56 within such casings.

The shaft which actuates the seed depositing mechanism in the hoppers 18 is indicated by the character 57 and attached at 58 to this shaft is a cam 59 (see Figure 3) having the extending flat surface at 60. The levers 52 terminate in the bent over portion 61 which engages the cam portions 60. A pair of friction clutches 62 are attached within the seed actuating shaft 57, such clutches being of any desired type, cone or disc, or any other slipping type of clutch.

Attached to the shaft 57 is a small sprocket 63 over which passes a sprocket chain 64 which passes over a substantially larger sprocket 65 which is attached at 66 to the shaft 15.

Now that the structure of my device has been explained I shall explain the operation thereof, it being understood that the device relates to an attachment for corn planters only, and it being understood also that certain mechanical equivalent arrangements could be employed therein effecting the same results as for instance, instead of a chain drive at 64, other types of actuating mechanism can be employed for operating the seed depositing mechanisms.

As the planter is drawn forwardly, the shaft 57 will be constantly power driven from the sprocket chain 64 and the shaft 15, so that the effect will be that of a constant force exerting torque against the shaft 57. The only times, however, that this torque can be utilized is when either of the triangular bars 39 or 40 penetrates into the ground as explained heretofore. When the bar penetrates, at that point one of the projections 44 will force the roller 48 and the rod 47 in the direction of the arrow 49 which pivots the lever 52 about the pivoting point 56 causing the portion 61 of the rod to pass beyond the portion 60 of the cam 59 thereby releasing the cam and allowing the shaft portion 57 within the hopper 18 to rotate and deposit the seed through the channel, it being understood that the above described operation is performed simultaneously on both sides of the arrangement or on both seed hoppers. In other words, the work of actuating the hoppers is being constantly performed by the wheels 16, etc. with the wheels 35 and bars and the cams providing a trigger effect only for releasing the seed.

In this manner, relatively little strain is applied against the rear mechanism, which can perform its functions of accurate spacing of the seed hills without interference, since it requires relatively little power.

It will also be noted that the quadrilateral arrangement of the various members 25, 28, 29 and 32 insures that the shaft 34 will rise and fall in a true vertical plane only regardless of the surface over which the wheels 35 travel, thereby still further insuring accuracy of the arrangement. The wheels 35 can be shifted laterally to follow the forward wheels 16, etc., and the bars 39 and 40 can be moved radially for harder or softer ground, as desired to provide penetration of the transverse bars under the various conditions desired with the various openings 37 permitting secure retention of the bars in any position.

After the operator passes through a field to the extremity thereof, in passing backwardly and adjacently to the row first formed, he can readily observe where the bars have penetrated by the troughs indicated by the character 67, these troughs being formed by the transverse bars 39 and 40, these troughs furthermore being readily visible since they are continuous and of fairly substantial depth. When returning, the operator can swing the rear wheels 35 slightly off of the ground by means of the levers 68 which are suitably secured at 69 and 70 to the members 28, the heavier bar such as 40 thereby causing the wheels to gravitate so that the bar 40 is directly above the ground level ready for instant penetration when the levers 68 are released. The operator can thus place the succeeding troughs 67 in direct alignment with the troughs already formed, after which the tractor is driven in the reverse direction with the troughs then occupying the positions as shown in Figure 5 so that as a result correct alignment is provided laterally across the field for the depositing of the seed hills. It will be noted that the triangular bars 39 and 40 can include suitable spaced openings 71 to accommodate various spacings of the wheels 35.

It will now be noted that I have provided the various advantages mentioned in the objects of my invention with further advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. In combination with a planter of the type having a power actuated seed depositing mechanism including intermittently rotated actuating shafts and clutches providing a constant torque to the shafts, said shafts normally held stationary and released periodically for actuation of said shafts; of releasing means for the shafts comprising a frame attached to the planter and supporting a pair of transversely spaced wheels rearwardly of the planter, an axle shaft attached to said wheels and rotatable therewith, projections on the ends of said axle shaft, rods mounted for reciprocation having ends supported on said axle shaft and arranged for intermittent abutting engagement with said projections, levers pivoted on said planter and pivotally connected to the other ends of said rods, cams secured to said actuating shafts, each cam having a flat surface, and each of said levers having a portion normally engaging the flat surface of its respective cam to hold the cam and its associated actuating shaft stationary, said lever adapted to be swung by reciprocation of its associated rod to move said lever portion away from its cam, whereby movement of the planter rotates the axle shaft and causes intermittent engagement of the rods by the projections to reciprocate the rods and periodically swing the levers to release the cams and actuating shafts.

2. In combination with a device of the character described in claim 1, transverse members extending laterally across the space between said wheels, said members being attached to the wheels adjacent the peripheral limits thereof and adapted to be imbedded in the ground upon rotation of said wheels to indicate transverse positioning of deposited seed, said members and projections being so related that seed is deposited in direct unison with imbedding of said members.

ANTHONY LANG.

REFERENCES CITED

The following references are of record in the file of this patent:

UNITED STATES PATENTS

| Number | Name | Date |
|---|---|---|
| 28,943 | Smith | June 26, 1860 |
| 185,771 | McVicker | Dec. 26, 1876 |
| 196,341 | DeVeaux | Oct. 23, 1877 |
| 206,336 | Kime | July 23, 1878 |
| 216,120 | Unthank | June 30, 1879 |
| 279,766 | Kendall | June 19, 1883 |
| 312,783 | Withrow | Feb. 24, 1885 |
| 344,572 | Frazure | June 29, 1886 |
| 348,250 | Voorhees | Aug. 31, 1886 |
| 535,941 | Coffits | Mar. 19, 1895 |
| 596,516 | Jarmin | Jan. 4, 1898 |
| 607,600 | Dill | July 19, 1898 |
| 649,386 | Woodling | May 8, 1900 |
| 1,152,033 | Matheny | Aug. 31, 1915 |
| 1,171,265 | Shraud | Feb. 8, 1916 |
| 1,204,809 | Matheny | Nov. 14, 1916 |
| 2,119,087 | Stout | May 31, 1938 |
| 2,334,808 | Cavinder | Nov. 23, 1943 |